United States Patent
Gomiciaga-Pereda et al.

(12) United States Patent (10) Patent No.: US 7,763,090 B2
(45) Date of Patent: Jul. 27, 2010

(54) CYCLONIC SEPARATING APPARATUS

(75) Inventors: Ricardo Gomiciaga-Pereda, Wiltshire (GB); James Dyson, Wiltshire (GB); Edward Charles Ormerod, Wiltshire (GB); John Lee Gruenig, Wiltshire (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 126 days.

(21) Appl. No.: 12/146,062

(22) Filed: Jun. 25, 2008

(65) Prior Publication Data

US 2009/0007370 A1 Jan. 8, 2009

(30) Foreign Application Priority Data

Jul. 5, 2007 (GB) ................................. 0713037.0

(51) Int. Cl.
*B01D 45/12* (2006.01)
(52) U.S. Cl. .................... 55/459.1; 55/337; 55/410; 55/429; 55/414; 55/447; 55/DIG. 3; 15/352; 15/353
(58) Field of Classification Search ............ 55/337, 55/459.1, 410, 429, 414, 447, DIG. 3; 15/353, 15/352
See application file for complete search history.

(56) References Cited

U.S. PATENT DOCUMENTS

| | | | |
|---|---|---|---|
| 1,791,304 A | | 2/1931 | Flick |
| 2,171,248 A | * | 8/1939 | Van Berkel ............ 55/392 |
| 2,256,524 A | * | 9/1941 | McKelvey ............. 96/211 |
| 3,254,687 A | * | 6/1966 | Tertyshnikov .......... 241/88.2 |
| 2001/0018865 A1 | | 9/2001 | Wegelin et al. |
| 2002/0178697 A1 | | 12/2002 | Oh et al. |

FOREIGN PATENT DOCUMENTS

| | | |
|---|---|---|
| EP | 0042723 | 12/1981 |
| EP | 0 972 573 | 1/2000 |
| EP | 1268076 | 1/2003 |

(Continued)

OTHER PUBLICATIONS

GB Search Report mailed Oct. 15, 2007, directed at counterpart GB application No. 0713037.0; 1 page.

(Continued)

*Primary Examiner*—Jason M Greene
*Assistant Examiner*—Dung Bui
(74) *Attorney, Agent, or Firm*—Morrison & Foerster LLP (57) ABSTRACT

A cyclonic separating apparatus includes a chamber for separating dirt and dust from an airflow, an inlet to the chamber and a shroud. The shroud includes a wall having inner and outer surfaces and a multiplicity of through-holes forming an outlet from the chamber. Each through-hole has an axis. The inner surface of the wall has a serrated profile having a plurality of serrations arranged around at least a part of the circumference of the wall, each serration having a first face and a second face. At least one through-hole passes through the first face of at least one serration. By providing a plurality of serrations around the inner circumference of the wall, the airflow is forced to follow a longer path through each through-hole for when compared to conventional arrangements. This reduces the amount of dirt and dust which is able to pass through the shroud.

23 Claims, 6 Drawing Sheets

FOREIGN PATENT DOCUMENTS

| | | |
|---|---|---|
| EP | 1370173 | 12/2003 |
| GB | 2296452 | 7/1996 |
| GB | 2 376 197 | 12/2002 |
| WO | WO-01/74493 | 10/2001 |
| WO | WO-02/067754 | 9/2002 |

OTHER PUBLICATIONS

The International Search Report and Written Opinion mailed on Sep. 23, 2008 directed towards counterpart international application No. PCT/GB2008/002100; 10 pages.

* cited by examiner

CYCLONIC SEPARATING APPARATUS

REFERENCE TO RELATED APPLICATIONS

This application claims the priority of United Kingdom Application No. 0713037.0, filed Jul. 5, 2007, the contents of which are incorporated herein by reference.

FIELD OF THE INVENTION

The invention relates to cyclonic separating apparatus for separating dirt and dust from an airflow. Particularly, but not exclusively, the invention relates to cyclonic separating apparatus suitable for a vacuum cleaner.

BACKGROUND OF THE INVENTION

Vacuum cleaners which utilise cyclonic separators are well known. Examples of such vacuum cleaners are shown in EP 0 042 723, EP 1 370 173 and EP 1 268 076. In general, an airflow in which dirt and dust is entrained enters a first cyclonic separator via a tangential inlet which causes the airflow to follow a spiral or helical path within a collecting chamber so that the dirt and dust is separated from the airflow. Relatively clean air passes out of the chamber whilst the separated dirt and dust is collected therein. In some applications, and as described in EP 0 042 723, the airflow is then passed to a second cyclonic separator which is capable of separating finer dirt and dust than the first cyclonic separator. It has been found useful to position a barrier member, known as a shroud, between the outlet to the first cyclonic separator and the inlet to the second cyclonic separator.

A shroud typically includes a wall having a large number of passageways or through-holes which communicate on their upstream side with the separating chamber of the first cyclonic separator. The through-holes of the shroud thus form the outlet from the first cyclonic separator. In use, some of the dirt and dust not separated by the first cyclonic separator passes through the through-holes in the shroud and into the second cyclonic separator.

However, the greater the amount of dirt and dust which is pulled through the shroud with the airflow, the greater the work which has to be done by the second cyclonic separator to separate the remaining dirt and dust from the airflow. Further, the greater the amount of dirt and dust which passes through the through-holes in the shroud, the greater the risk of the through-holes in the shroud becoming blocked with dirt and dust. Blocked through-holes in a shroud can reduce the efficiency at which the vacuum cleaner operates. Therefore, the risk of blockages forming should be minimised. Consequently, it is beneficial to retain the maximum amount of dirt and dust within the first cyclonic separator and prevent as much dirt and dust as possible from passing through the through-holes in the shroud.

In order to reduce the amount of dirt and dust passing from the first cyclonic separator into other parts of a vacuum cleaner, it is known to provide angled passageways around the outlet from the first cyclonic separator. The passageways are angled away from the direction of airflow around the outlet such that the air has to turn through more than a right angle in order to pass through the passageways. Dirt and dust, having inertia considerably greater than that of air, is unable to turn as sharply. Consequently, the larger particles of dirt and dust do not pass through the passageways and remain in the first cyclonic separator. Examples of such arrangements are shown in EP 0 972 573 and GB 2 376 197. In these arrangements, a plurality of longitudinal blades are provided. The blades are angled away from the airflow to form a plurality of angled passageways. However, the blades define relatively long passageways which have a relatively large cross-sectional area in comparison to known shrouds comprising through-holes. This may allow unwanted dirt and dust to pass through the passageways.

It is an object of the invention to provide a shroud for separating apparatus in which the amount of dirt and dust which passes through the through-holes in the shroud is reduced in comparison to known prior art arrangements.

SUMMARY OF THE INVENTION

According to the invention, there is provided cyclonic separating apparatus comprising a chamber for separating dirt and dust from an airflow, an inlet to the chamber and a shroud comprising a wall having an inner surface, an outer surface and a multiplicity of through-holes forming an outlet from the chamber, each through-hole having an axis, wherein the inner surface of the wall has a serrated profile comprising a plurality of serrations arranged around at least a part of the circumference of the wall, each serration having a first face and a second face, and at least one through-hole passes through the first face of at least one serration.

By providing a plurality of serrations around the inner circumference of the wall, the airflow is forced to follow a longer path through each through-hole when compared to conventional arrangements. This reduces the amount of dirt and dust which is able to pass through the shroud. Further, the increased path length afforded by the serrations prevents the airflow from "short-cutting" across the through-hole. A "short-cut" occurs when the airflow is able to take the shortest direct path from the upstream side to the downstream side of the through-hole without turning through as sharp an angle as is desired. This may result in a greater amount of particles of dirt and dust passing through the shroud. Further, the provision of serrations improves the manufacturing process, which requires fewer manufacturing steps.

Preferably, the axis of the at least one through-hole lies at an angle to the first face of the at least one serration in the range of 60° to 120°. More preferably, the axis of the at least one through-hole lies substantially perpendicular to the first face of the at least one serration.

Preferably, the first face of the at least one serration lies at an angle to the second face of the at least one serration in the range of 60° to 120°. More preferably, the first face lies substantially perpendicular to the second face. These arrangements provide an increased path length for the airflow through the respective through-hole, improve the structural strength of the shroud and simplify the manufacturing process.

Preferably, the outer surface of the wall is curved and each through-hole has an axis which is arranged at an obtuse angle to the tangent of the curved outer surface of the wall at an upstream side of the through-hole. More preferably, the axis of the at least one through-hole is arranged at an angle in the range of 130° to 150° to the tangent of the curved outer surface of the wall at the upstream side of the through-hole. By arranging the axes of the through-holes at an obtuse angle to the tangent of the curved outer surface of the wall, the risk of larger particles of dirt and dust passing through the through-holes can be further reduced.

Preferably, the wall has a longitudinal axis and at least some of the through-holes are arranged in a plurality of axially-extending columns, each column corresponding to a single serration on the inner surface of the wall. By arranging the through-holes in axially-extending columns, the packaging of the through-holes in the wall of the shroud is improved. This allows a greater number of through-holes per unit area of the wall of the shroud. Such a regular arrangement of through-holes is also simpler to manufacture.

Preferably, the axes of the through-holes in at least two adjacent columns are parallel to one another. More preferably, the axes of the through-holes in at least four adjacent columns are parallel to one another.

Preferably, at least some of the through-holes are spaced from one another at the inner surface of the wall by less than 1 mm. More preferably, at least some of the through-holes are spaced from one another at the inner surface of the wall by 0.6 mm or less. More preferably, at least some of the through-holes are spaced from one another at the inner surface of the wall by 0.4 mm or less.

Preferably, at least some of the through-holes are spaced from one another at the inner surface of the wall by a distance which is 45% or less of the width or height of a through-hole. More preferably, at least some of the through-holes are spaced from one another at the inner surface of the wall by a distance which is 30% or less of the width or height of a through-hole. More preferably, at least some of the through-holes are spaced from one another at the inner surface of the wall by a distance which is 18% or less of the width or height of a through-hole.

By providing relatively small separations between the through-holes, more through-holes can be packed into the shroud per unit area and less material is required to manufacture the shroud without compromising structural integrity.

BRIEF DESCRIPTION OF THE DRAWINGS

An embodiment of the invention will now be described with reference to the accompanying drawings, in which.

DETAILED DESCRIPTION OF THE INVENTION

Figure 1:
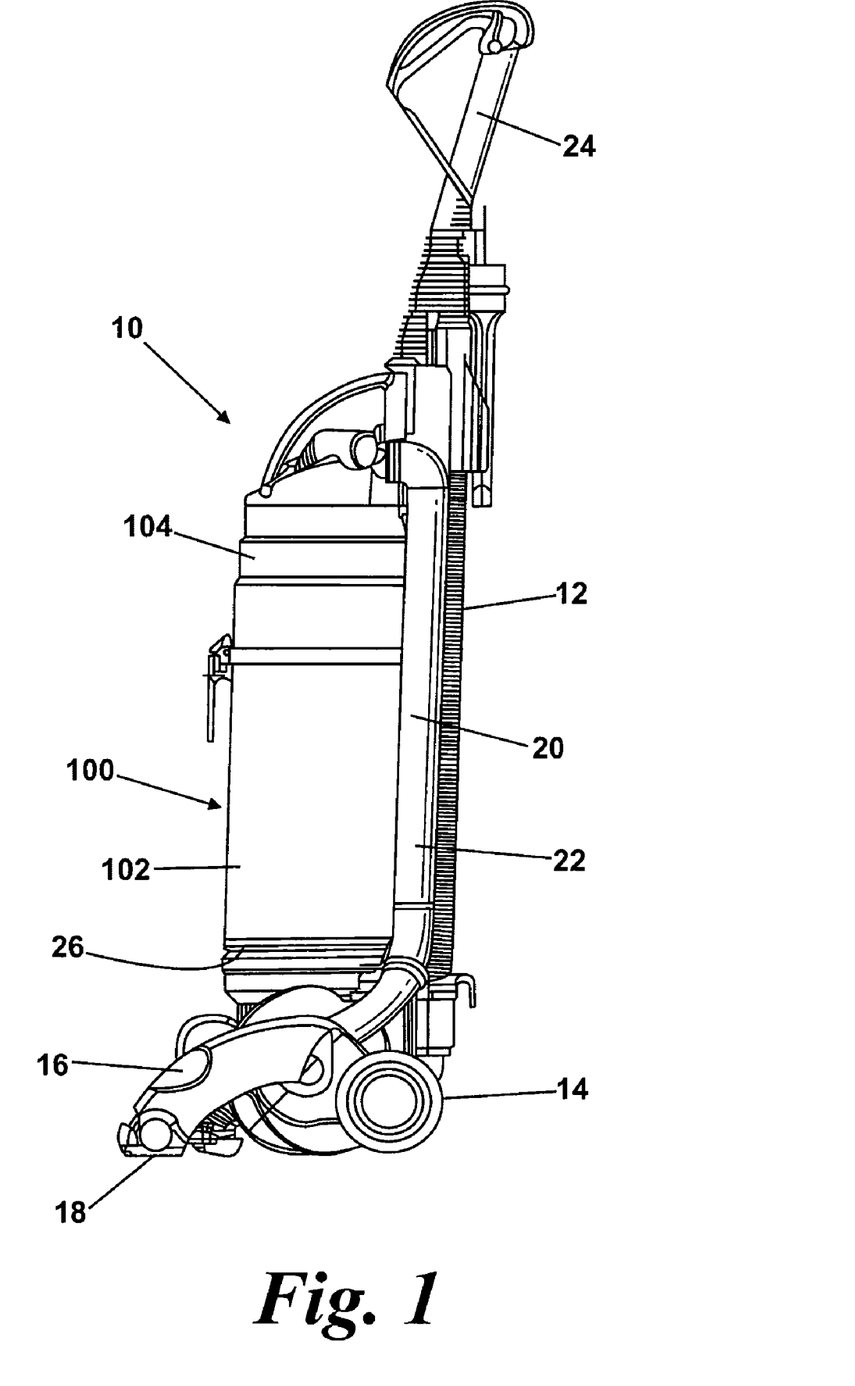
FIG. 1 is a side view of a prior art vacuum cleaner incorporating cyclonic separating apparatus comprising a known shroud.

FIG. 1 shows an upright vacuum cleaner 10 having a main body 12 which includes a motor and fan unit (not shown) and a pair of wheels 14. A cleaner head 16 is pivotably mounted on the lower end of the main body 12 and a dirty air inlet 18 is provided in the underside of the cleaner head 16 facing the floor surface. The main body 12 further includes a spine 20 which extends vertically upward and includes ducting 22 for carrying an airflow. A handle 24 is formed at the upper end of the spine 20. The handle 24 can be manipulated by a user to manoeuvre the vacuum cleaner 10 across a floor surface. The handle 24 is also releasable in the manner of a wand to allow above the floor cleaning. This feature is not material to the present invention and will not be described any further here.

The main body 12 further includes a plurality of outlet ports 26 for exhausting air from the vacuum cleaner 10.

The vacuum cleaner 10 further comprises cyclonic separating apparatus 100. The cyclonic separating apparatus 100 has a cylindrical bin 102 and an upper housing 104. The cylindrical bin 102 and upper housing 104 are arranged to be separable by a user for emptying purposes. The cyclonic separating apparatus 100 is supported on the main body 12 above the outlet ports 26 and adjacent the spine 20. The interior of the cyclonic separating apparatus 100 is in communication with the dirty air inlet 18 through the ducting 22 in the spine 20. The cyclonic separating apparatus 100 can be removed from the main body 12 to facilitate emptying of collected dirt and dust.

Figure 2:
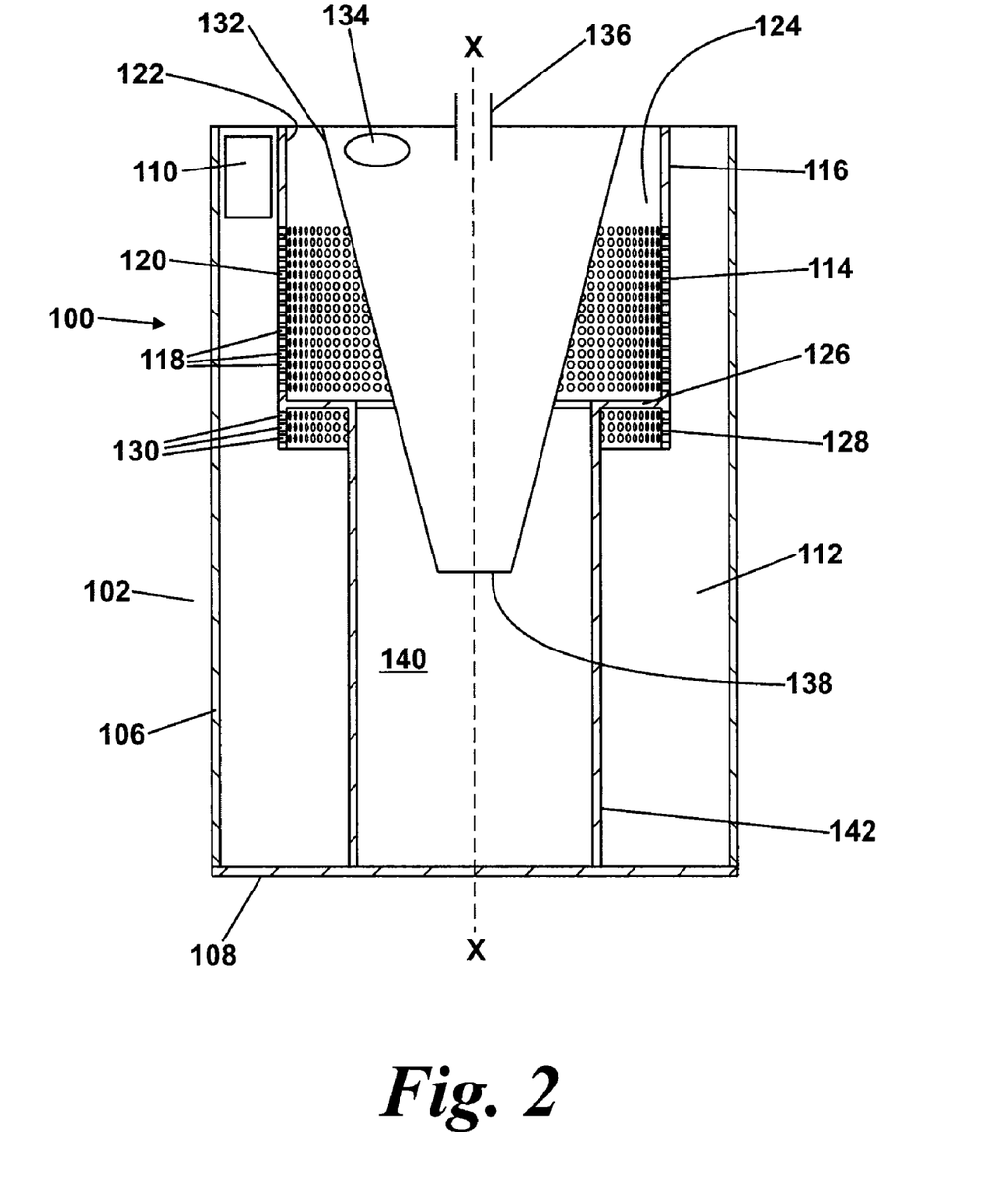
FIG. 2 is a sectional side view of cyclonic separating apparatus incorporating a known shroud.

The cyclonic separating apparatus 100 is shown in more detail in FIG. 2. In FIG. 2, the cyclonic separating apparatus 100 is shown separate from the vacuum cleaner 10 and without the upper housing 104. However, in use, the upper housing 104 would be attached to the cylindrical bin 102 and the cyclonic separating apparatus 100 would be attached to the vacuum cleaner 10 as shown in FIG. 1.

The cylindrical bin 102 has a side wall 106 and a base 108 which closes the lower end of the cylindrical bin 102. An inlet 110 is located adjacent the upper end of the side wall 106. The side wall 106, base 108 and inlet 110 form an upstream cyclone 112. The upstream cyclone 112 has a longitudinal axis X-X. The inlet 110 is arranged tangentially to the side wall 106 so that, when an airflow enters the upstream cyclone 112, the airflow is encouraged to follow a helical path about the axis X-X.

A shroud 114 is located concentrically with the axis X-X and is situated at the upper end of the upstream cyclone 112. The shroud 114 has a cylindrical wall 116 in which a multiplicity of perforations or through-holes 118 are arranged. The through-holes 118 have an upstream side formed in an outer surface 120 of the cylindrical wall 116 and a downstream side formed in an inner surface 122 of the cylindrical wall 116. The upstream side of the through-holes 118 communicates with the interior of the upstream cyclone 112 and the downstream side of the through-holes 118 communicates with a passageway 124.

The shroud 114 has a shroud base 126 which separates the passageway 124 from the upstream cyclone 112. An annular depending lip 128 is located below the shroud base 126 concentric with the cylindrical wall 116 of the shroud 114. The depending lip 128 has a plurality of through-holes 130 formed therein. The through-holes 130 help to extract dirt and dust from the airflow before the airflow enters the through-holes 118 of the shroud 114.

A downstream cyclone 132 is located inwardly of the shroud 114. The downstream cyclone 132 is frustoconical in shape and has an inlet 134 at an upper end. The inlet 134 is in communication with the passageway 124. The downstream cyclone 132 further includes an outlet 136 and a cone opening 138. The outlet 136 provides a passageway for cleaned air leaving the cyclonic separating apparatus 100 and passing to other parts of the vacuum cleaner 10 downstream of the cyclonic separating apparatus 100, for example, filters (not shown) or the motor. A downstream collector 140 is located beneath the downstream cyclone 132 and is in communication with the cone opening 138. The downstream collector 140 includes a cylindrical wall 142 which is located inwardly of the shroud 114 and extends to the base 108 of the upstream cyclone 112. The shroud base 126 abuts the cylindrical wall 142 of the downstream collector 140 and isolates the downstream collector 140 from the upstream cyclone 112 and the passageway 124. The downstream collector 140 is arranged to collect fine dirt and dust separated in the downstream cyclone 132 and subsequently deposited through the cone opening 138.

In use, the motor and fan unit (not shown) draws a flow of dirt-laden air through the dirty air inlet 18 and into the cyclonic separating apparatus 100. Dirt-laden air enters the cyclonic separating apparatus 100 through the inlet 110. Due to the tangential arrangement of the inlet 110, the airflow is encouraged to follow a helical path around the interior of the upstream cyclone 112. Larger dirt and dust particles are separated by cyclonic motion. These particles are then collected at the base 108 of the upstream cyclone 112.

The partially-cleaned air then flows back up the interior of the upstream cyclone 112, exits the upstream cyclone 112 via the through-holes 118 in the shroud 114 and passes into the passageway 124. The air then flows from the passageway 124 into the downstream cyclone 132 via the inlet 134. The inlet 134 is arranged tangentially to the interior wall of the downstream cyclone 132, which encourages the air to follow a helical path around the interior of the downstream cyclone 132. This motion separates dirt and dust from the airflow. The downstream cyclone 132 has a diameter smaller than that of the upstream cyclone 112. Therefore, the downstream cyclone 132 is able to separate smaller particles of dirt and dust from the partially-cleaned airflow than the upstream cyclone 112. Separated dirt and dust exits the downstream cyclone 132 via the cone opening 138 and passes into the downstream collector 140 where it is collected.

The cleaned air flows back up through the downstream cyclone 132 and exits the cyclonic separating apparatus 100 via the outlet 136. The cleaned air then passes from the outlet 136, through a pre-motor filter (not shown), across the motor and fan unit (for cooling purposes) and through a post-motor filter (not shown) before being exhausted from the vacuum cleaner 10 through the outlet ports 26.

A shroud 200 forming part of cyclonic separating apparatus according to the invention is shown in FIGS. 3 to 9. In these figures, the shroud 200 is shown separately from the remainder of the cyclonic separating apparatus but is suitable for use in the cyclonic separating apparatus 100 of FIG. 2 in place of the shroud 114 illustrated therein.

Figures 3, 4, 5:
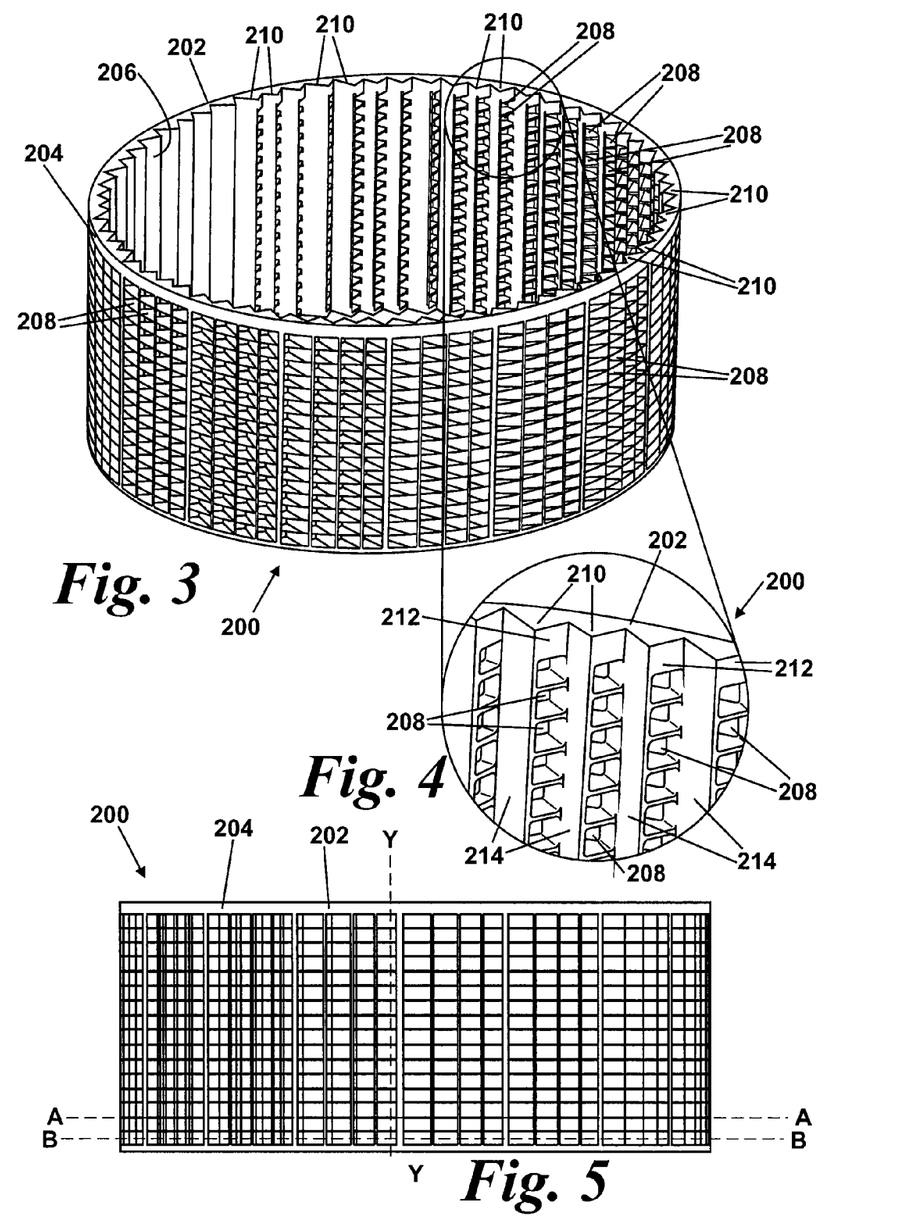
FIG. 3 is an isometric view of a shroud forming part of the cyclonic separating apparatus according to the invention.
FIG. 4 is an enlarged isometric view of part of FIG. 3.
FIG. 5 is a side view of the shroud of FIG. 3.

Turning first to FIGS. 3 to 5, the shroud 200 comprises a cylindrical wall 202. The wall 202 has an axis Y-Y, a cylindrical outer surface 204 and an inner surface 206. When used in the cyclonic separating apparatus 100, the axis Y-Y is coincident with the axis X-X. A multiplicity of through-holes 208 are formed in the wall 202. Each through-hole 208 has an upstream side formed in the outer surface 204 and a downstream side formed in the inner surface 206. The through-holes 208 are arranged in a plurality of axially-extending columns. The through-holes 208 are also arranged in a plurality of circumferentially-extending rows. This arrangement can clearly be seen in FIGS. 3 and 5.

Each through-hole 208 has a square cross-section. By this is meant that, looking directly through a through-hole 208 from the upstream side to the downstream side, the hole has a square shape. In this embodiment, each through-hole 208 has a width and a height of 2.2 mm.

The inner surface 206 has a serrated profile around the circumference of the wall 202. This is shown in more detail in FIG. 4. By this is meant that the circumference of the inner surface 206 comprises a plurality of serrations 210. In other words, the inner surface 206 of the wall 202 comprises a number of faces arranged around the circumference of the wall, each face being at an angle to an adjacent face. Each serration 210 comprises a first face 212 and a second face 214.

Figure 6:
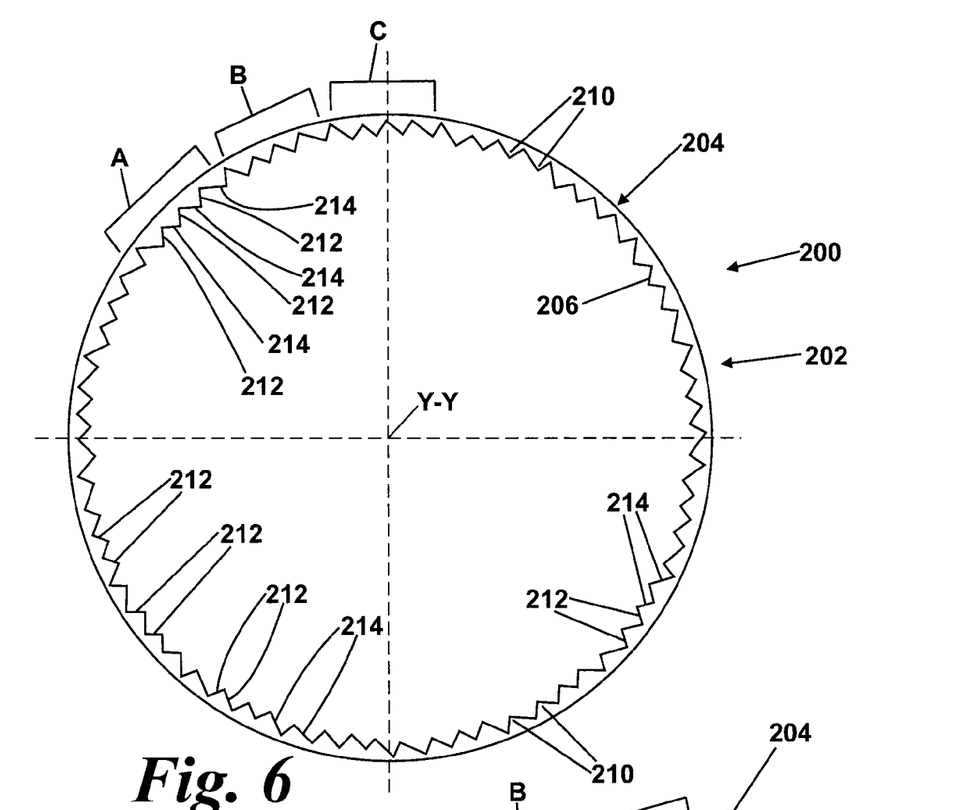
FIG. 6 is a section through the shroud of FIG. 3 taken along the line A-A of FIG. 5.
Figure 7:
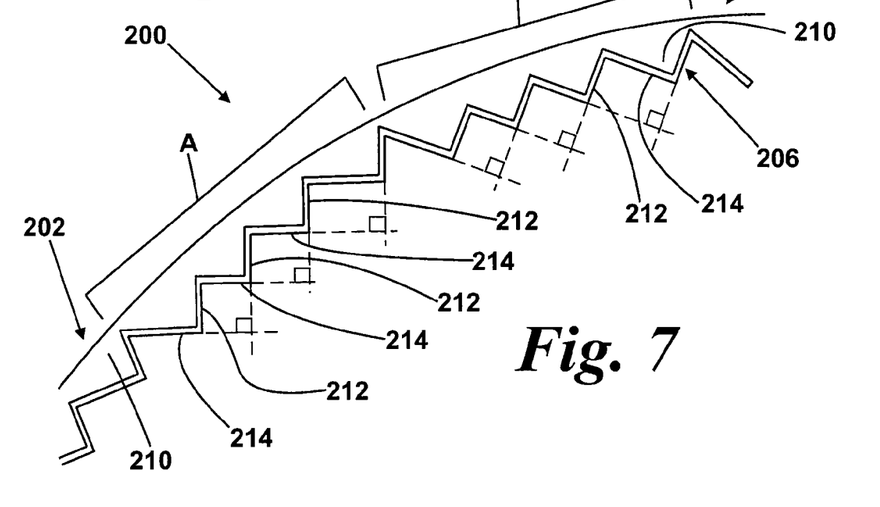
FIG. 7 is an enlarged view of a part of FIG. 6.

In this embodiment, the first and second faces 212, 214 are perpendicular to one another. This is shown in FIGS. 6 and 7. It can be seen from these figures that the thickness of the cylindrical wall 202 varies across each serration 210, and that the serrations 210 are arranged in groups A, B, C of four serrations 210 each. The serrations 210 within each group A, B, C have first faces 212 which are parallel to one another and second faces 214 which are parallel to one another. The groups A, B, C are arranged adjacent one another. This pattern extends around the whole circumference of the inner surface 206.

Each serration 210 extends the full height of the cylindrical wall 202. A single column of through-holes 208 corresponds to a single serration 210 on the inner surface 206. By this is meant that only a single through-hole 208 passes through a single serration 210 around the circumference of the inner surface 206. However, any number of through-holes 208 may be provided in each axially-extending column. In this embodiment, each column has 16 though-holes 208. The downstream side of a through-hole 208 in any one column is formed in the first face 212 of the corresponding serration 210. This is best illustrated in FIGS. 3 and 4.

The arrangement of the through-holes 208 in the serrations 210 results in a plurality of partitions being formed in the circumferential and axial directions between the through-holes 208. It is desirable that these partitions should be as thin as possible to increase the available through-hole 208 area in the shroud 200, and to reduce the amount of material, for example, plastic, which is required to manufacture the shroud 200. In this embodiment, the thickness of the partitions is 0.4 mm as measured on the inner surface 206 of the wall 202. However, whilst this is preferred, any value of less than 1 mm is suitable. Expressed another way, the through-holes 208 in a column are spaced from the through-holes 208 in an adjacent column by less than 1 mm. Additionally, the through-holes 208 in a column are spaced from one another by less than 1 mm. Alternatively, the through-holes 208 in a row are spaced from the through-holes 208 in an adjacent row by less than 1 mm.

Alternatively, the thickness of the partitions can be expressed as a percentage of the width or height of the through-holes 208. In this embodiment, the through-holes 208 have a width of 2.2 mm and a height of 2.2 mm, and the partitions are 0.4 mm thick. Therefore, the partitions have a thickness of approximately 18% of the width or height of the through-holes 208 as measured on the inner surface 206 of the wall 202. However, whilst this is preferred, any value of 45% or less is suitable. In other words, the through-holes 208 in a column are spaced from the through-holes 208 in an adjacent column by a distance of 45% or less of the width of the through-holes 208. Additionally, the through-holes 208 in a column are spaced from one another by a distance of 45% or less of the height of the through-holes 208. This range gives a good trade-off between maximizing the area of the through-holes 208 and offering suitable structural strength.

Figures 8, 9:
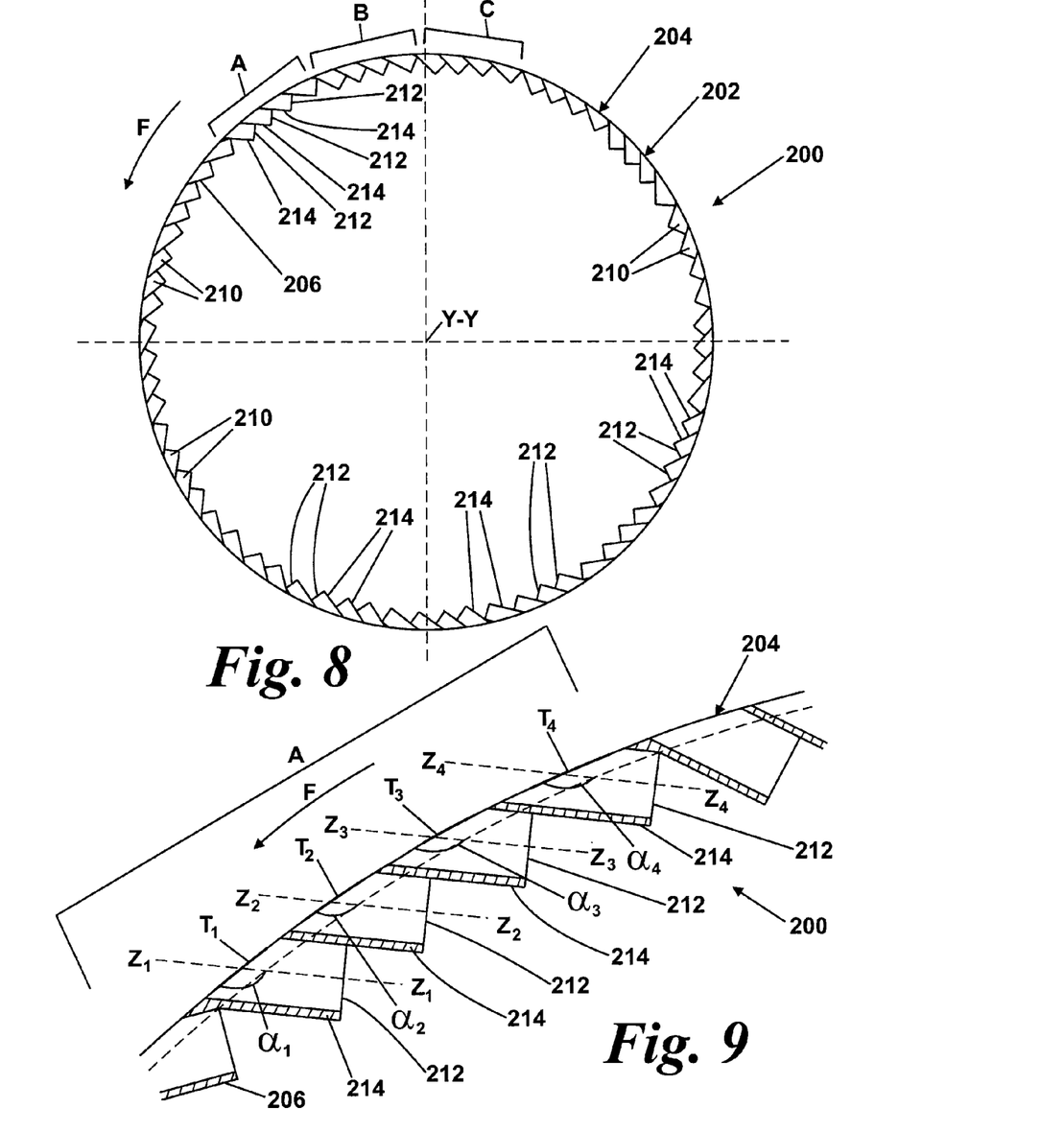
FIG. 8 is a section through the shroud of FIG. 3 taken along the line B-B of FIG. 5.
FIG. 9 is an enlarged view of a part of FIG. 8.

FIGS. 8 and 9 show a cross-section through the shroud 200 taken along the line B-B of FIG. 5. Each through-hole has an axis $Z_1$-$Z_1$, $Z_2$-$Z_2$, $Z_3$-$Z_3$, $Z_4$-$Z_4$. In FIG. 9, each axis $Z_1$-$Z_1$, $Z_2$-$Z_2$, $Z_3$-$Z_3$, $Z_4$-$Z_4$ is arranged perpendicular to the first face 212 and parallel to the second face 214 of the respective serration 210. Each of the axes $Z_1$-$Z_1$, $Z_2$-$Z_2$, $Z_3$-$Z_3$, $Z_4$-$Z_4$ lies in a plane which is perpendicular to the longitudinal axis Y-Y of the cylindrical wall 202.

The four axes $Z_1$-$Z_1$, $Z_2$-$Z_2$, $Z_3$-$Z_3$, $Z_4$-$Z_4$ in the group A are parallel to one another. The same applies to the groups B, C as shown in FIG. 8. Therefore, the axes of the through-holes 208 in each group A, B, C lie at an angle to the axes of the through-holes 208 in an adjacent group A, B, C.

The four axes $Z_1$-$Z_1$, $Z_2$-$Z_2$, $Z_3$-$Z_3$, $Z_4$-$Z_4$ lie at angles $\alpha_1$, $\alpha_2$, $\alpha_3$, $\alpha_4$ to the tangent of the cylindrical outer surface 204. The angles $\alpha_1$, $\alpha_2$, $\alpha_3$, $\alpha_4$ are the obtuse angles between the respective axes $Z_1$-$Z_1$, $Z_2$-$Z_2$, $Z_3$-$Z_3$, $Z_4$-$Z_4$ and the respective tangents $T_1$, $T_2$, $T_3$, $T_4$ as shown in FIG. 9. In this embodiment, the angles $\alpha_1$, $\alpha_2$, $\alpha_3$, $\alpha_4$ vary between 130° for $\alpha_1$ to 150° for $\alpha_4$. The difference between the angles $\alpha_1$, $\alpha_2$, $\alpha_3$, $\alpha_4$ is due to the requirement for the axes $Z_1$-$Z_1$, $Z_2$-$Z_2$, $Z_3$-$Z_3$, $Z_4$-$Z_4$ of each of the through-holes 208 in the group A to be parallel to one another. This causes a variation in the angles $\alpha_1$, $\alpha_2$, $\alpha_3$, $\alpha_4$ as the measurement point moves around the circumference of the outer surface 204 of the wall 202.

Arrow F shows the direction of the airflow adjacent the outer surface 204 of the wall 202 when, in use, the shroud 200 forms part of the cyclonic separating apparatus 100. The axes $Z_1$-$Z_1$, $Z_2$-$Z_2$, $Z_3$-$Z_3$, $Z_4$-$Z_4$ are arranged at an obtuse angle to the direction F of the oncoming airflow. This is so that the air must turn through an angle greater than 90° to pass through the through-holes 208 in the shroud 200. The angle through which the airflow must turn is equal to the angles $\alpha_1$, $\alpha_2$, $\alpha_3$, $\alpha_4$ between the respective axes $Z_1$-$Z_1$, $Z_2$-$Z_2$, $Z_3$-$Z_3$, $Z_4$-$Z_4$ and the respective tangents as shown in FIG. 9. Therefore, in order to pass through a respective through-hole 208, the airflow must turn through at least 130° (for through-hole 208 with axis $Z_1$-$Z_1$) to 150° (for through-hole 208 with axis $Z_4$-$Z_4$).

In use, the shroud 200 forms part of the cyclonic separating apparatus 100 in place of the shroud 114. The motor and fan unit (not shown) draws a flow of dirt-laden air through the dirty air inlet 18 and into the cyclonic separating apparatus 100. Dirt-laden air enters the cyclonic separating apparatus 100 through the inlet 110. Due to the tangential arrangement of the inlet 110, the airflow is encouraged to follow a helical path around the interior of the upstream cyclone 112. Larger dirt and dust particles are separated by cyclonic motion. These particles are then collected at the base 108 of the upstream cyclone 112.

The partially-cleaned air then flows back up the interior of the upstream cyclone 112, and passes around the outer surface 204 of the shroud 200. In order to pass through the through-holes 208 in the shroud 200, the airflow must turn through at least 130°. Considering the flow through an individual through-hole 208, the airflow, having a relatively small mass (and, consequently, inertia) is able to turn sharply to pass through the through-hole from the upstream face to the downstream face. However, larger particles of dirt and dust are unable to follow due to their larger mass (and, consequently, inertia). Therefore, larger particles of dirt and dust continue past the through-holes 208 in the shroud 200 and are thrown back into the upstream cyclone 112 to be collected in the cylindrical bin 102.

The cleaned airflow passes through the through-holes 208 in the shroud 200 and into the passageway 124. The air then flows from the passageway 124 into the downstream cyclone 132 as previously described. By providing the claimed shroud arrangement, larger particles of dirt and dust are prevented from passing through the shroud 200 and into the downstream cyclone 132. Therefore, the downstream cyclone 132 can operate at a higher efficiency because it will be challenged by an airflow in which particles of a smaller range of particle size are entrained.

The invention is not limited to the detailed description given above. Variations will be apparent to the person skilled in the art. For example, the through-holes in the shroud need not be square. Other arrangements could be used, for example rectangular, circular, triangular, trapezoid or rhomboid arrangements.

Whilst it is preferred that through-holes in the shroud are at an obtuse angle to the tangent of the cylindrical outer wall, this need not be so. Any angle to the tangent may be used. For example, the axes of the respective through-holes may form an acute angle with respect to the direction of the airflow. In this case, the airflow has only to turn through a small angle to pass through the through-holes.

Figure 10:
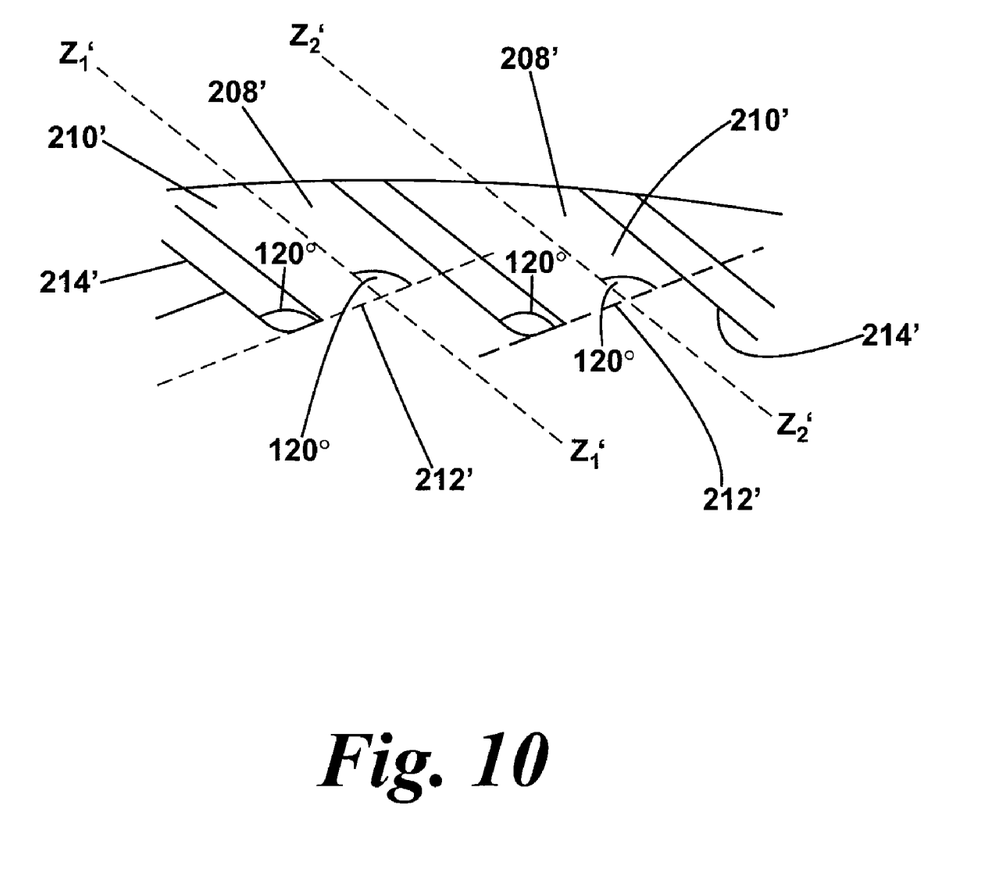
FIG. 10 is a section showing an alternative arrangement of the shroud of FIG. 3.

The first and second faces of the serrations need not be substantially perpendicular to one another. Whilst it is preferred that the angle between the first and second faces is substantially a right angle, angles between 60° and 120° could also be used. Further, the axes of the through-holes need not be substantially perpendicular to the first face. Whilst it is preferred that the angle between the axis of a through-hole and the respective first face is substantially a right angle, angles between 60° and 120° could also be used. This range of angles provides a useful comprise between the amount of material required to manufacture the shroud and the structural strength of the shroud. An example of such an arrangement is shown in FIG. 10. In FIG. 10, the angle between the first and second faces 212', 214' of each serration 210 is 120°. Further, the axes $Z_1'$-$Z_1'$, $Z_2'$-$Z_2'$ of the through-holes 208 lie at 120° with respect to the first faces 212' of the respective serrations 210'.

Further, whilst it is preferred that the serrations extends around the whole inner circumference of the shroud, some areas of the inner surface of the cylindrical wall of the shroud may not include serrations and may instead be cylindrical or flat. Further, not all of the serrations need comprise through-holes. Alternate serrations could include through-holes, or groups of serrations comprising through-holes could be interspersed with groups of serrations not comprising through-holes.

Further, the number of through-holes per serration may vary. Any number of through-holes may be provided in a column. Additionally, the serrations need not extend the full height of the cylindrical wall of the shroud. They may extend for part of the height of the cylindrical wall.

Further, the serrations need not be parallel to the axis of the cylindrical wall. Neither do they need to be vertically orientated. They may extend at any practical angle to the axis of the cylindrical wall whilst still giving the wall a serrated profile around the circumference of the wall.

It is not necessary for the shroud to be cylindrical in shape: a tapered or conical shroud could be provided. The through-holes can be arranged in any pattern, although a regular pattern is preferred. For example, a chequerboard or staggered pattern may be used.

Whilst it is preferred that the partitions between adjacent through-holes have thicknesses which are 45% or less of the width or height of the through-holes when measured on the inner surface of the shroud, this is not essential. Any thickness of partition may be used.

The inlet to the cyclone need not be arranged tangentially but could incorporate vanes or other swirl inducing devices designed to impart the necessary swirl to the incoming airflow. A plurality of downstream cyclones may be provided instead of a single downstream cyclone. Additionally, further cyclonic separation stages may be provided; for example, a third stage downstream of the downstream cyclone.

The cleaning appliance need not be an upright vacuum cleaner. The invention is applicable to other types of vacuum cleaner, for example, cylinder machines, stick-vacuums or hand-held cleaners. Further, the present invention is applicable to other types of cleaning appliances, for example, a wet and dry machine or a carpet shampooer. Other variations and modifications will be apparent to a skilled reader.

The invention claimed is:

1. A cyclonic separating apparatus comprising a chamber for separating dirt and dust from an airflow, an inlet to the chamber and a shroud comprising a wall having a substantially circular cross-section, the wall comprising an inner surface, an outer surface upstream from the inner surface, and a multiplicity of through-holes forming an outlet from the chamber, each through-hole having an axis, wherein the inner surface of the wall has a serrated profile comprising a plurality of serrations arranged around at least a part of a circumference of the wall, each serration having a first face and a second face, and at least one through-hole passes through the first face of at least one serration.

2. The cyclonic separating apparatus as claimed in claim 1, wherein the axis of the at least one through-hole lies substantially parallel to the second face of the at least one serration.

3. The cyclonic separating apparatus as claimed in claim 1 or 2, wherein the axis of the at least one through-hole lies at an angle to the first face of the at least one serration in the range of 60° to 120°.

4. The cyclonic separating apparatus as claimed in claim 3, wherein the axis of the at least one through-hole lies substantially perpendicular to the first face of the at least one serration.

5. The cyclonic separating apparatus as claimed in claim 1 or 2, wherein the first face of the at least one serration lies at an angle to the second face of the at least one serration in the range of 60° to 120°.

6. The cyclonic separating apparatus as claimed in claim 5, wherein the first face lies substantially perpendicular to the second face.

7. The cyclonic separating apparatus as claimed in claim 1 or 2, wherein the outer surface of the wall is curved and the axis of the at least one through-hole is arranged at an obtuse angle to the tangent of the curved outer surface of the wall at an upstream side of the through-hole.

8. The cyclonic separating apparatus as claimed in claim 7, wherein the axis of the at least one through-hole is arranged at an angle in the range of 130° to 150° to the tangent of the curved outer surface of the wall at the upstream side of the through-hole.

9. The cyclonic separating apparatus as claimed in claim 1 or 2, wherein the shroud has a longitudinal axis and at least some of the through-holes are arranged in a plurality of axially-extending columns, each column corresponding to a single serration on the inner surface of the wall.

10. The cyclonic separating apparatus as claimed in claim 9, wherein the axes of each of the through-holes in a column lie substantially parallel to one another.

11. The cyclonic separating apparatus as claimed in claim 10, wherein the axes of each of the through-holes in a column lie substantially perpendicular to the first face and substantially parallel to the second face of the respective serration.

12. The cyclonic separating apparatus as claimed in claim 9, wherein the axes of the through-holes in at least two adjacent columns are parallel to one another.

13. The cyclonic separating apparatus as claimed in claim 12, wherein the axes of the through-holes in at least four adjacent columns are parallel to one another.

14. The cyclonic separating apparatus as claimed in claim 1 or 2, wherein at least some of the through-holes are spaced from one another at the inner surface of the wall by less than 1 mm.

15. The cyclonic separating apparatus as claimed in claim 14, wherein at least some of the through-holes are spaced from one another at the inner surface of the wall by 0.6 mm or less.

16. The cyclonic separating apparatus as claimed in claim 15, wherein at least some of the through-holes are spaced from one another at the inner surface of the wall by 0.4 mm or less.

17. The cyclonic separating apparatus as claimed in claim 1 or 2, wherein at least some of the through-holes are spaced from one another at the inner surface of the wall by a distance which is 45% or less of the width or height of a through-hole.

18. The cyclonic separating apparatus as claimed in claim 17, wherein at least some of the through-holes are spaced from one another at the inner surface of the wall by a distance which is 30% or less of the width or height of a through-hole.

19. The cyclonic separating apparatus as claimed in claim 18, wherein at least some of the through-holes are spaced from one another at the inner surface of the wall by a distance which is 18% or less of the width or height of a through-hole.

20. The cyclonic separating apparatus as claimed in claim 1 or 2, wherein the wall is cylindrical.

21. The cyclonic separating apparatus as claimed in claim 1 or 2, wherein the wall is tapered.

22. A cleaning appliance comprising the cyclonic separating apparatus as claimed in claim 1 or 2.

23. The cleaning appliance as claimed in claim 22, wherein the cleaning appliance is a vacuum cleaner.

* * * * *